Aug. 1, 1967  G. BRUNER  3,333,772
DISCHARGE NOZZLE APPARATUS FOR JET AIRCRAFT
Filed March 30, 1965  7 Sheets-Sheet 1
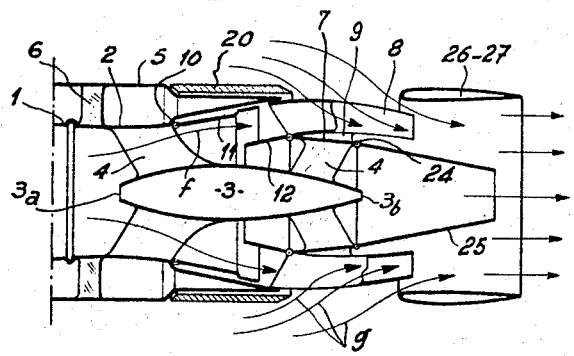
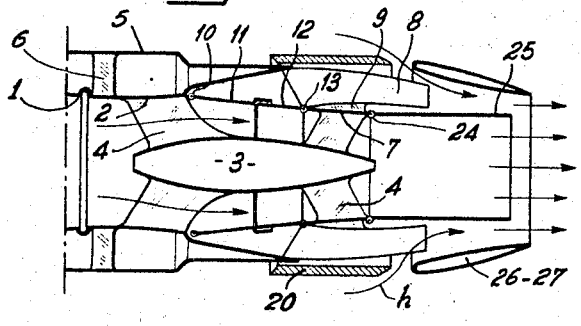
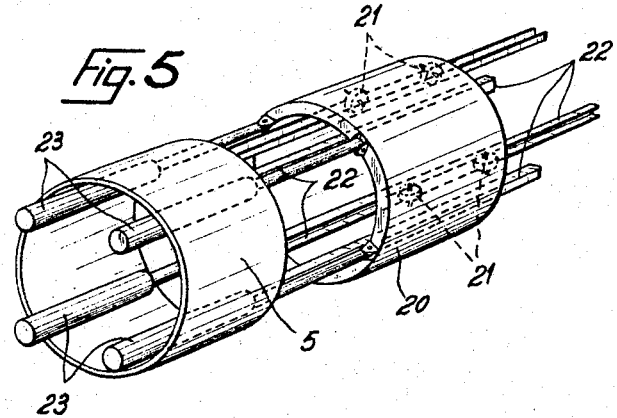

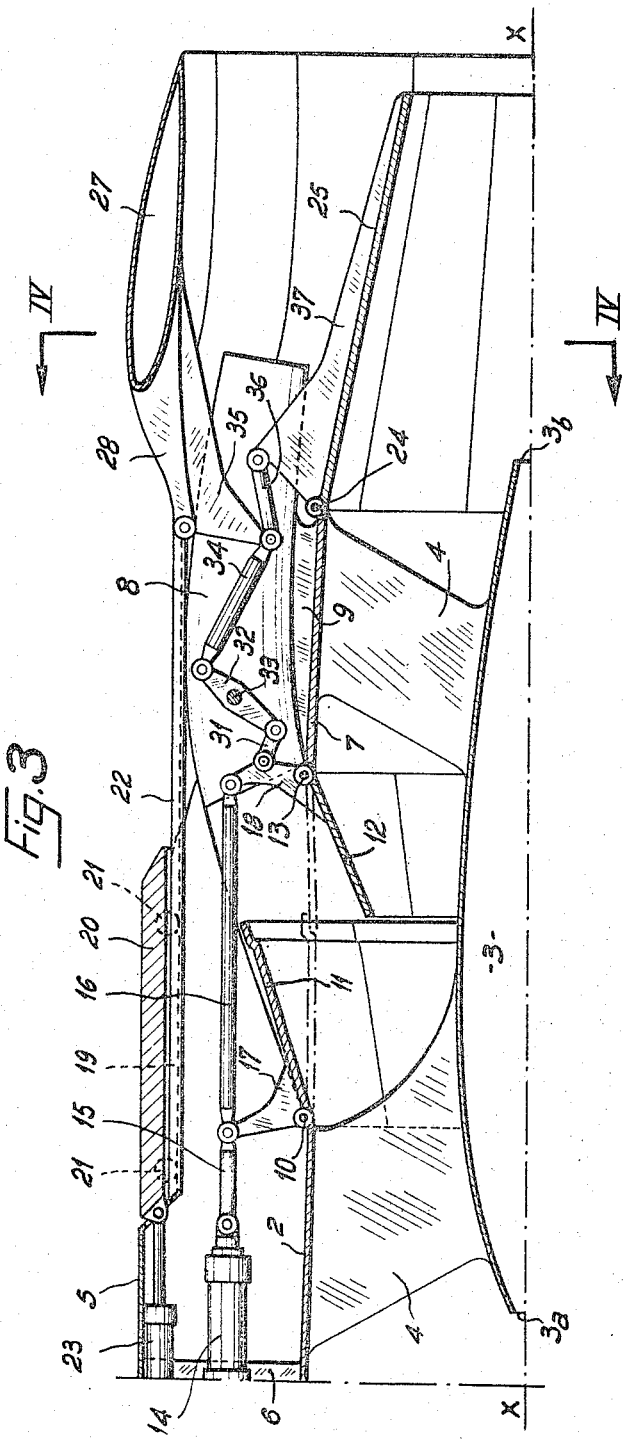

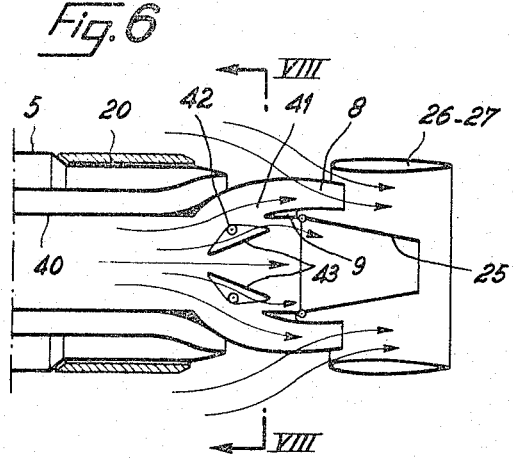
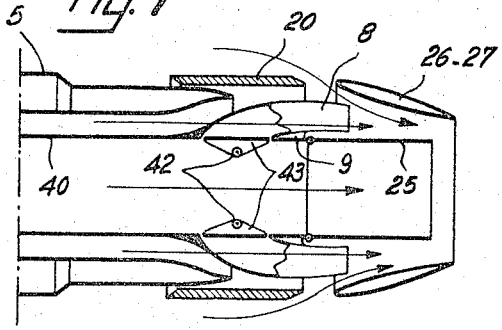
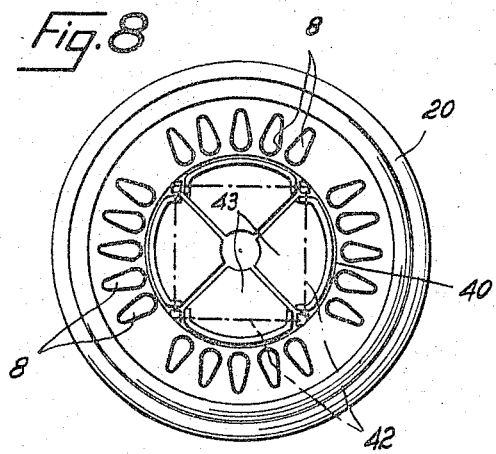

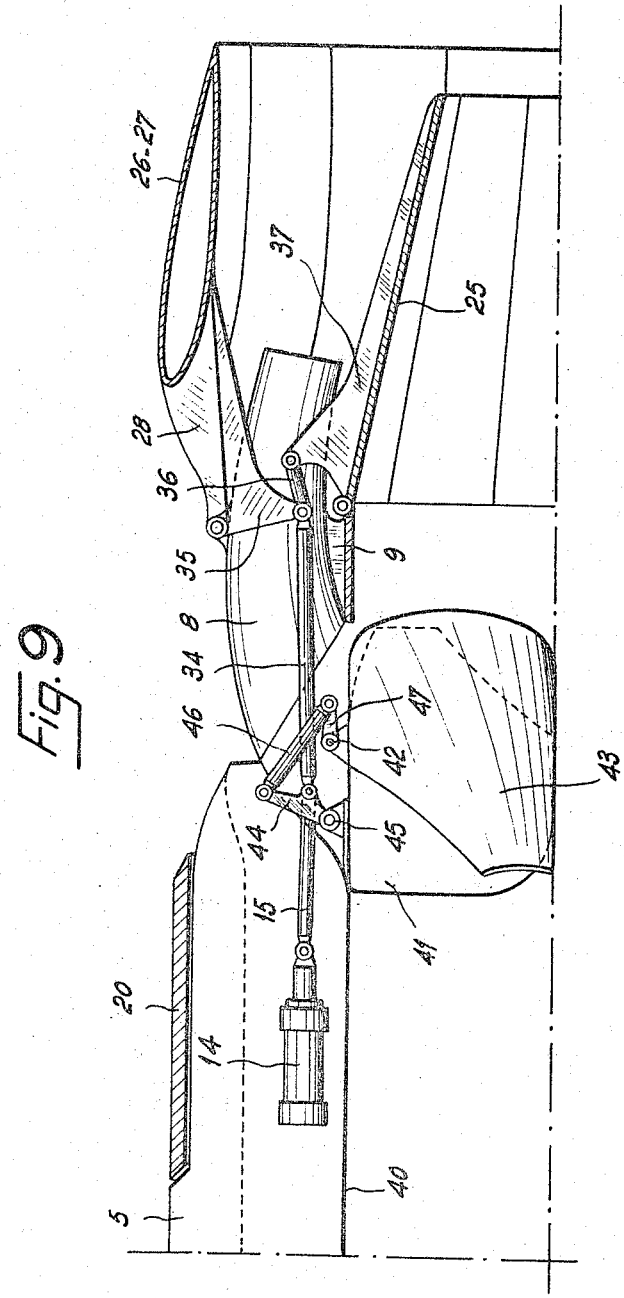

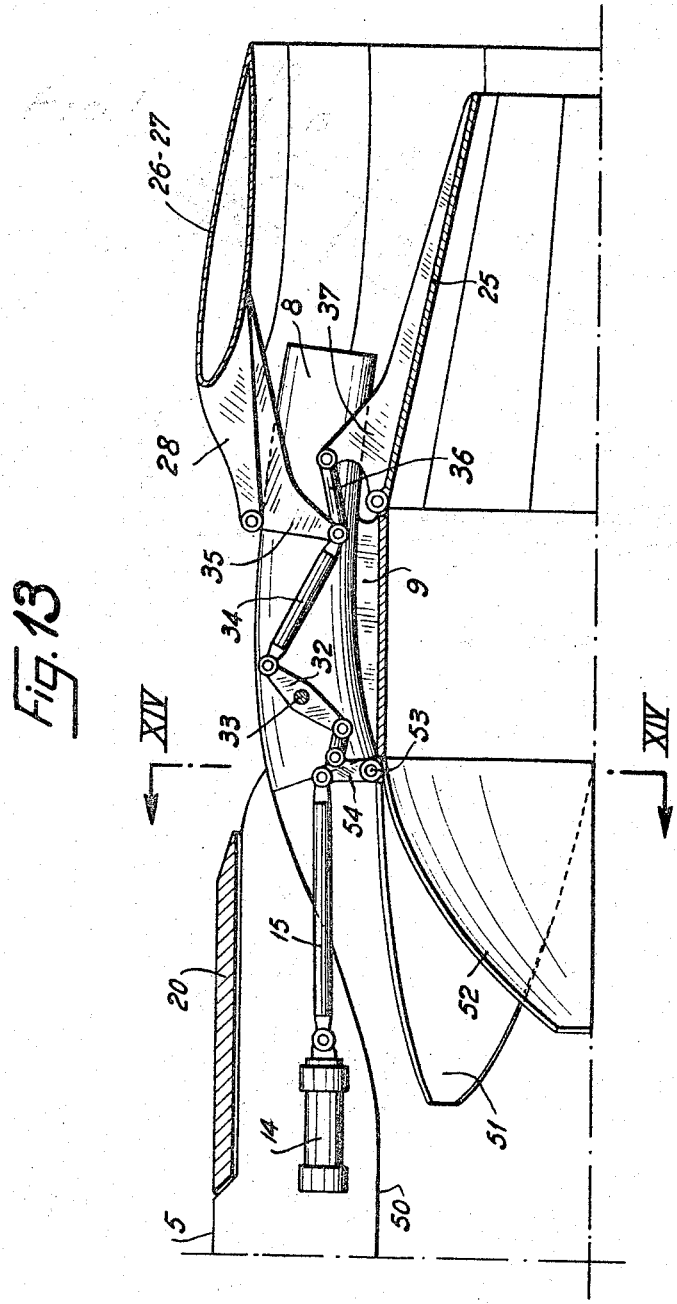

United States Patent Office 3,333,772
Patented Aug. 1, 1967

3,333,772
DISCHARGE NOZZLE APPARATUS FOR JET AIRCRAFT
Georges Bruner, Paris, France, assignor to Societe Anonyme des Ateliers d'Aviation Louis Breguet, Paris, France, a company of France
Filed Mar. 30, 1965, Ser. No. 443,974
Claims priority, application France, Apr. 24, 1964, 972,170
7 Claims. (Cl. 239—265.13)

A major disadvantage of air traffic using jet-engined aircraft is the intense noise to which people inhabiting the neighbourhood of an airfield are subjected. This noise becomes most troublesome at take-off and when passing over the bounds of the airfield under full throttle. Limiting the total level of noise perceived to 107 decibels by day and 102 by night (regulations laid down at London Airport) is no longer adequate, since the ever-increasing frequency of flights aggravates the discomfort felt by the local inhabitants.

This state of affairs has led some airlines to avoid night take-off completely, and to recommend to their pilots to reduce the power of their jet engines above the zone neighbouring the airfield. This latter measure must be regarded as extremely dangerous. Furthermore, moving airfields away from the inhabited zone has the disadvantage of increasing the total time taken to travel from one city centre to another, a time which is in many cases much too long relatively to the time taken by the actual flight of the aircraft.

In order to obviate these disadvantages, silencers have been used which are permanently installed at the end of the discharge nozzles of the engines. Known installations hitherto cut down the perceptible noise by only 3 to 4 decibels, and seriously affect the economic working of the airline in question by reducing the efficiency of the engines.

The object of the present invention is to provide a discharge nozzle apparatus for jet aircraft which makes it possible to obviate the aforesaid disadvantages. This nozzle apparatus comprises a central discharge passage, ducts substantially parallel to the said passage and arranged externally of the said passage about its end portion, the said passage comprising upstream of the inlet orifice of the said ducts apertures provided with mobile flaps making it possible either to provide continuity for the central passage or to direct a portion of the flow of discharged gas towards the external ducts so as to effect a dilution of the said gas in the air induced from about the said ducts, which causes a considerable reduction in noise.

Preferably the central passage terminates in swivellable flaps and about the ring formed by the external ducts there is provided a ring formed of mobile elements which is intended either to constitute a divergent passage with the swivellable flaps when operating as a silencer or to bring about a small intake of air reducing the drag when the continuity of the central passage is reestablished.

The discharge nozzle apparatus is advantageously used as a silencer for take-off, continuity being reestablished for the central passage in a gradual manner when changing to cruising flight, by gradual modification of the position of the various mobile elements.

The invention is illustrated by way of example in the accompanying drawings, in which:

FIGURES 1 and 2 are diagrammatic axial sectional views illustrating the operation of a first form of embodiment of the invention.

FIGURE 3 is a half-section on a larger scale relating to this same form of embodiment.

FIGURE 5 is a partial view in perspective showing the mounting and control of the mobile sleeve.

FIGURES 6 and 7 are diagrammatic views similar to FIGURES 1 and 2 but relating to a first variant.

FIGURE 8 is a sectional view on VIII—VIII of FIGURE 6.

FIGURE 9 is a half-section on a larger scale relating to the first variant.

FIGURE 13 is a half-section on a larger scale relating to the second variant.

Figure 4:
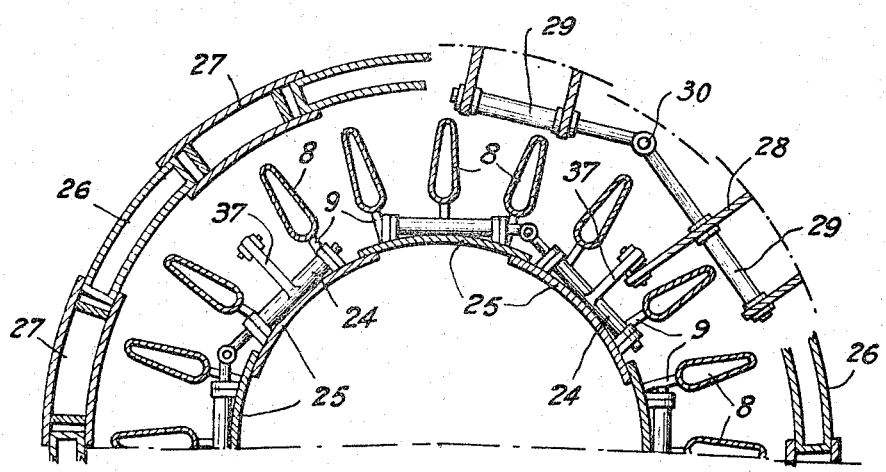
FIGURE 4 is a section taken on IV—IV of FIGURE 3, partly broken away.
Figure 14:
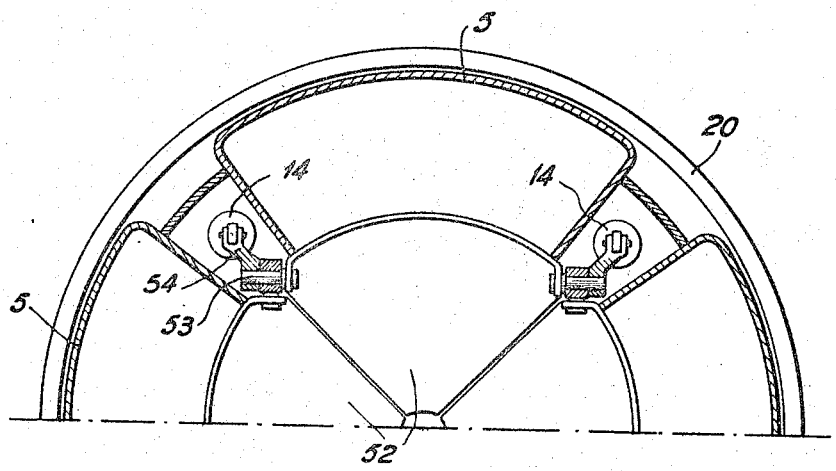
FIGURE 14 is a cross-section on XIV—XIV of FIGURE 13.

In the form of embodiment illustrated in FIGURES 1 to 4, the discharge nozzle 1 of a jet engine is connected to a first section of central passage 2 on the axis of which there is arranged a streamlined core 3 fixed to radial ribs 4 (FIGURE 3). The ends 3a and 3b of the core 3 are open in order to permit equilibrium of temperatures within and without the said core.

The passage 2 is surrounded by a casing 5 fixed to radial arms 6.

Co-axially with the section 2, rearwardly thereof, the ribs 4 carry a second central passage section 7, about which are fixed the flat radial ducts 8 held by ribs 9 and curved slightly rearwards and towards the axis X—X of the discharge nozzle apparatus. At the front, these ducts open into the space included between the passage sections 2 and 7 and the rear edge of the casing 5.

Connected to the rear edge of the passage section 2, for pivoting movement about pins 10, are flaps 11 in the form of segments of cylinders which can be either held in alignment with the said section (FIGURE 2) or swung outwardly against the profiled rear edge of the casing 5 (FIGURE 1). In a similar manner, the flaps 12 are pivotably mounted on pins 13 on the front edge of the passage section 7, and these flaps can either be connected to the flaps 11 to form a continuous central passage with the sections 2 and 7 (FIGURE 2), or can be swung inwardly as shown in FIGURE 1 and FIGURE 3.

The actuation of the flaps 11 and 12 is effected by means of jacks 14 connected by links 15 and 16 to arms 17 and 18 of the respective flaps (FIGURE 3).

The casing 5 comprises a sheath 19 on which can be lodged a cylindrical sleeve 20 rolling by means of wheels 21 in rails 22. Jacks 23 (FIGURE 5) make it possible to displace the sleeve 20 to bring it from the position shown in FIGURE 1 to the position shown in FIGURE 2.

Along the rear edge of the central passage 7 there are mounted on pivot pins 24 (see also FIGURE 4) flaps 25 which are imbricated in one another so as to be capable of either being orientated in alignment with the passage section 7 (FIGURE 2), or of being brought together at their free ends somewhat in the form of a truncated cone, as FIGURE 1 shows.

Provided about the flaps 25 and the discharge end of the ducts 8 is a ring formed of profiled elements 26 and 27 (FIGURE 4) which are arranged so as to be capable of being displaced between the positions shown in FIGURES 1 and 2. The elements 27 have double walls and they extend at their edges about the elements 26 which they entrain in their movements.

As FIGURE 4 shows, the elements 27 are articulated by arms 28 to pins 29 connected to one another by universal joints 30. Control is effected from jacks 14 by means of rod systems starting from the arms 18 of the flaps 12 and comprising links 31, transmission levers 32 pivoting on fixed pins 33 provided between the ducts 8, links 34 fixed to extensions 35 of the arms 28 and links 36 fixed to ribs 37 of the internal flaps 25 (FIGURE 3).

The apparatus which has just been described operates in a very simple manner.

When it is desired to operate this apparatus as a silencer, for example at the time of take-off, the jacks 14 and 23 are retracted, which brings the various parts of the apparatus into the position shown in FIGURE 1, namely:

Sleeve 20 retracted forwardly, freeing the space surrounding the ducts 8,

Flaps 11 moved away outwardly and flaps 12 brought towards the axis,

Flaps 25 brought towards the axis and elements 26, 27 withdrawn.

Thus, a portion of the flow of gas issuing from the jet engine passes in the direction of the arrow *f* into the ducts 8 and mixes with the air inspired by an ejector effect as indicated by the arrows *g* between the said ducts and in the divergent portion formed between the flaps 25 and 27.

The central jet is concentrated by the flaps 25 which are brought together in the form of a truncated cone.

In this way it is possible to obtain a considerable dilution of the gas, which may amount to more than three times in value, and to cut down the noise produced to the extent of 12 to 15 decibels.

When passing to cruising flight, it is possible by acting on the jacks 14 and 23 to bring the apparatus gradually to the configuration shown in FIGURE 2;

Sleeve 20 moved rearwardly about the ducts 8 and now leaving only a narrow passage upstream of the ring 26, 27, Flaps 11 and 12 and flaps 25 forming a cylindrical continuous passage with the section 2 and section 7.

Elements 26, 27 closed-in in truncated-cone form.

The gradual maneuvering of the mobile elements makes it possible to diminish slowly the induction of air in proportion as the speed of the aircraft increases, and thus to prevent increasing the drag.

When the various elements of the apparatus occupy the positions shown in FIGURE 2, only a slight flow of air remains in the direction of the arrow *h* between the flaps 25 and the ring 26, 27, to eliminate the tail-end drag residues.

In the variant shown in FIGURES 6 to 9, a central continuous passage 40 comprises at the rear the flattened radial duct 8, fixed to ribs 9.

Upstream of the opening of the said ducts, the passage 40 is perforated with ovoid apertures 41 in which there are mounted, about substantially median pivots 42, flaps 43 of the same form.

These flaps are controlled by the jacks 14 which operate the flaps 25 and the ring 26, 27 provided at the outlet of the apparatus, as in the preceding example of embodiment.

Control is effected by means of levers 44 pivotably mounted on fixed pins 45 and acted upon by the links 15. The levers 44 act in their turn on the flaps by means of links 46 and arms 47 fixed to the pins 42 (FIGURE 9).

The casing 5 also carries a sliding sleeve 20 arranged as in the previous example. Its rear profiled portion deflects the deviated gases towards the aperture of the external ducts 8. The method of operation is also the same as in the aforesaid example.

At take-off, the jacks 14 are extended, the flaps 43 are swung towards the axis as shown in FIGURE 6, the flaps 25 are made to approach and the elements 26, 27 are withdrawn.

A portion of the gas flow ejected is deflected by the flaps 43 towards the ducts 8, which as in the previous example, produces a silencer effect.

When passing to cruising speed, the flaps are gradually brought to the position in which they reestablish the continuity of the central passage.

The variant shown in FIGURES 10 to 14 comprises, opposite the upstream opening of the ducts 8, a central passage 50 in which are formed ogival apertures 51 the point of which is directed forwardly and which can be closed by flaps 52 of suitable form which are mounted pivotably on pins 53 provided at the rear. The flaps 52 can either re-establish the continuity of the central passage or, by bringing their front points together (FIGURE 12), form a kind of deflecting truncated pyramid in the said passage.

The control of the flaps 52 is effected by the jacks 14 whose links 15 act on arms 54 fixed to the pins 53 (FIGURE 13). The links 31 are articulated to the arms 54 and transmit control to the flaps and elements 25–27 in the manner described in connection with FIGURE 3.

Otherwise the arrangement is identical to that of the previous examples.

Figure 10:
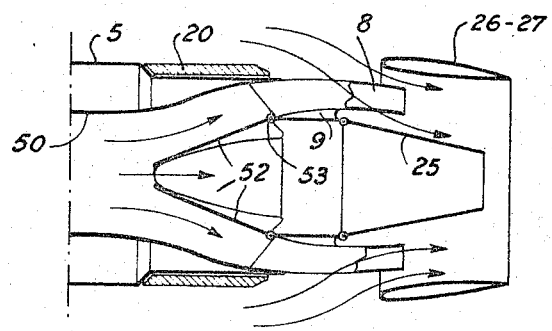
FIGURES 10 and 11 are views similar to FIGURES 1 and 2 but relating to a second variant.
Figure 11:
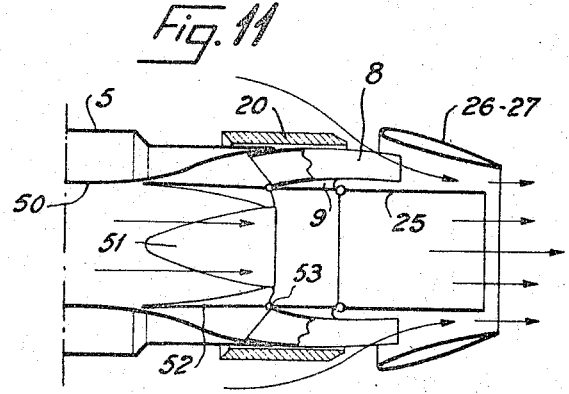
Figure 12:
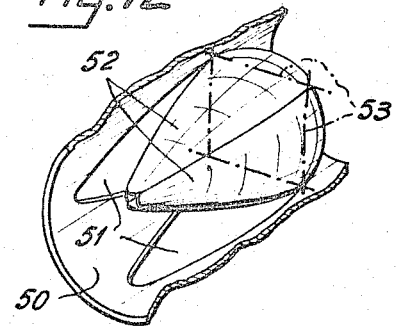
FIGURE 12 is a perspective view of a detail.

The same applies as regards the method of operation. FIGURE 10 shows the discharge nozzle apparatus in the silencer configuration and FIGURE 11 the position for cruising flight.

What I claim is:

1. A discharge nozzle apparatus for jet aircraft, which is arranged so as to be capable of changing from a position in which it operates as a silencer to a normal flight position, comprising a central discharge passage, and ducts directed rearwardly substantially parallel to the said passage and arranged in ring form externally of said passage and about its rear portion, the said passage comprising, upstream of the inlet openings of the said ducts, apertures provided with mobile flaps making it possible either to re-establish the continuity of the central passage or to direct towards the external ducts a portion of the discharged gas flow so as to cause a dilution of the gas in the air induced about the said ducts, which substantially reduces the noise produced and a sliding sleeve for uncovering the ring of external ducts when operating as a silencer, and to recover the greater part of the said ring in the other operating position.

2. A discharge nozzle apparatus for jet aircraft, which is arranged so as to be capable of changing from a position in which it operates as a silencer to a normal flight position, comprising a central discharge passage, and ducts substantially parallel to the said passage and arranged in ring form externally of the said passage and about its rear portion, the said passage comprising, upstream of the inlet openings of the said ducts, apertures provided with mobile flaps making it possible either to re-establish the continuity of the central passage or to direct towards the external ducts a portion of the discharged gas flow so as to cause a dilution of the gas in the air induced about the said ducts, which substantially reduces the noise produced, and wherein the central passage terminates at the rear in swivelling flaps, and about the ring formed by the external ducts there is provided a ring formed of mobile elements, these latter being adapted either to constitute a divergent passage with the swivelling flaps when operating as a silencer, or to induce a slight current of air reducing the drag when the continuity of the passage is re-established, the said mobile elements, constituting the external ring, fitting laterally and alternately in one another.

3. A discharge nozzle apparatus for jet aircraft, which is arranged so as to be capable of changing from a position in which it operates as a silencer to a normal flight position, comprising a central discharge passage, and ducts substantially parallel to the said passage and arranged in ring form externally of thhe said passage and about its rear portion, the said passage comprising, upstream of the inlet openings of the said ducts, apertures provided with mobile flaps making it possible either to re-establish the continuity of the central passage or to direct towards the external ducts a portion of the discharged gas flow so as to cause a dilution of the gas in the air induced about the said ducts, which substantially reduces the noise produced, and wherein the central passage terminates at the rear in swivelling flaps, and about the ring formed by the external ducts there is provided a ring formed of mobile elements, these latter being adapted either to constitute a divergent passage with the swivelling flaps when operating as a silencer, or to induce a slight current of air reducing the drag when the continuity of the passage is re-established, the said mobile elements, constituting the external ring, fitting laterally and alternately in one another, and having an aerodynamic profile.

4. A discharge nozzle apparatus for jet aircraft, which is arranged so as to be capable of changing from a position in which it operates as a silencer to a normal flight position, comprising a central discharge passage, and ducts substantially parallel to the said passage and arranged in ring form externally of the said passage and about its rear portion, the said passage comprising, upstream of the inlet openings of the said ducts, apertures provided with mobile flaps making it possible either to re-establish the continuity of the central passage or to direct towards the external ducts a portion of the discharged gas flow so as to cause a dilution of the gas in the air induced about the said ducts, which substantially reduces the noise produced, and wherein the central passage terminates at the rear in swivelling flaps, and about the ring formed by the external ducts there is provided a ring formed of mobile elements, these latter being adapted either to constitute a divergent passage with the swivelling flaps when operating as a silencer, or to induce a slight current of air reducing the drag when the continuity of the passage is re-established, the said flaps and mobile elements being controlled by one and the same battery of jacks acting on them by rod systems.

5. A discharge nozzle apparatus for jet aircraft, which is arranged so as to be capable of changing from a position in which it operates as a silencer to a normal flight position, comprising a central discharge passage, and ducts substantially parallel to the said passage and arranged in ring form externally of the said passage and about its rear portion, the said passage comprising, upstream of the inlet openings of the said ducts, apertures provided with mobile flaps making it possible either to re-establish the continuity of the central passage or to direct towards the external ducts a portion of the discharged gas flow so as to cause a dilution of the gas in the air induced about the said ducts, which substantially reduces the noise produced, and wherein the central passage terminates at the rear in swivelling flaps, and about the ring formed by the external ducts there is provided a ring formed of mobile elements, these latter being adapted either to constitute a divergent passage with the swivelling flaps when operating as a silencer, or to induce a slight current of air reducing the drag when the continuity of the passage is re-established, the central passage being formed of two separate sections separated by an interval and additional flaps are articulated to the respective edges of the said interval, the upstream flaps opening towards the exterior and the downstream flaps towards the interior.

6. A discharge nozzle apparatus for jet aircraft, which is arranged so as to be capable of changing from a position in which it operates as a silencer to a normal flight position, comprising a central discharge passage, and ducts substantially parallel to the said passage and arranged in ring form externally of the said passage and about its rear portion, the said passage comprising, upstream of the inlet openings of the said ducts, apertures provided with mobile flaps making it possible either to re-establish the continuity of the central passage or to direct towards the external ducts a portion of the discharged gas flow so as to cause a dilution of the gas in the air induced about the said ducts, which substantially reduces the noise produced, and wherein the central passage terminates at the rear in swivelling flaps, and about the ring formed by the external ducts there is provided a ring formed of mobile elements, these latter being adapted either to constitute a divergent passage with the swivelling flaps when operating as a silencer, or to induce a slight current of air reducing the drag when the continuity of the passage is re-established, and wherein the said passage comprises ovoid apertures in which there are mounted flaps of the same form which are articulated about median transverse pins.

7. A discharge nozzle apparatus for jet aircraft, which is arranged so as to be capable of changing from a position in which it operates as a silencer to a normal flight position, comprising a central discharge passage and ducts substantially parallel to the said passage and arranged in ring form externally of the said passage and about its rear portion, the said passage comprising, upstream of the inlet openings of the said ducts, apertures provided with mobile flaps making it possible either to re-establish the continuity of the central passage or to direct towards the external ducts a portion of the discharged gas flow so as to cause a dilution of the gas in the air induced about the said ducts, which substantially reduces the noise produced, and wherein the central passage terminates at the rear in swivelling flaps, and about the ring formed by the external ducts there is provided a ring formed of mobile elements, these latter being adapted either to constitute a divergent passage with the swivelling flaps when operating as a silencer, or to induce a slight current of air reducing the drag when the continuity of the passage is re-established, and wherein the said passage comprises ogival apertures directed forwardly and in these apertures there are mounted flaps of the same form which are articulated about transverse pins arranged in the vicinity of their rear end, so that the flaps can approach one another towards the axis of the passage at their front points.

References Cited

UNITED STATES PATENTS

| | | | |
|---|---|---|---|
| 3,027,714 | 4/1962 | Parker | 239—265.13 |
| 3,032,981 | 5/1962 | Lawler | 239—265.13 |
| 3,055,174 | 9/1962 | Gratz et al. | 239—265.13 |

EVERETT W. KIRBY, *Primary Examiner.*